United States Patent
Leo et al.

(10) Patent No.: US 8,738,482 B2
(45) Date of Patent: May 27, 2014

(54) METHOD FOR PREPARING AN OPTIMAL ALTERNATIVE BILLING PLAN FOR MOBILE TELEPHONY USERS MANAGED THROUGH A CALL CENTER

(75) Inventors: Juan Moises Pascal Leo, Madrid (ES); Enrique Frias Martinez, Madrid (ES)

(73) Assignee: Telefonica, S.A., Madrid (ES)

( * ) Notice: Subject to any disclaimer, the term of this patent is extended or adjusted under 35 U.S.C. 154(b) by 543 days.

(21) Appl. No.: 12/958,983

(22) Filed: Dec. 2, 2010

(65) Prior Publication Data
US 2012/0143735 A1   Jun. 7, 2012

(51) Int. Cl.
G07F 19/00 (2006.01)
H04M 15/00 (2006.01)

(52) U.S. Cl.
USPC .......................................................... 705/34

(58) Field of Classification Search
USPC .......................................................... 705/34
See application file for complete search history.

(56) References Cited

U.S. PATENT DOCUMENTS

| | | | |
|---|---|---|---|
| 5,027,388 A * | 6/1991 | Bradshaw et al. | 379/114.1 |
| 5,659,601 A * | 8/1997 | Cheslog | 379/121.02 |
| 2002/0102962 A1 * | 8/2002 | Grinn et al. | 455/406 |
| 2002/0154751 A1 * | 10/2002 | Thompson et al. | 379/114.01 |
| 2002/0173291 A1 * | 11/2002 | Hutcheson et al. | 455/408 |
| 2002/0194096 A1 * | 12/2002 | Falcone et al. | 705/35 |
| 2003/0086546 A1 * | 5/2003 | Falcone et al. | 379/114.21 |
| 2009/0186600 A1 * | 7/2009 | Hutcheson et al. | 455/408 |
| 2010/0029244 A1 * | 2/2010 | Moodbidri et al. | 455/404.1 |
| 2010/0169234 A1 * | 7/2010 | Metzger et al. | 705/348 |
| 2012/0053990 A1 * | 3/2012 | Pereg et al. | 705/7.31 |

* cited by examiner

Primary Examiner — Seye Iwarere
(74) Attorney, Agent, or Firm — Sughrue Mion, PLLC

(57) ABSTRACT

The invention relates to a method for preparing an optimal alternative billing plan for mobile telephony users managed through a call center, which is applicable to the recommendation of an optimal telephony plan to the customers of an operator, considering the consumption of the customer, the risk of the customer migrating to another and the market strategy of the operator. It comprises the estimation of the real bill of a customer during a time period covering the last M months, a simulated estimation of the bill of the customer using any generic plan based on the mean traffic of the last M months, applying a simulation algorithm and the estimation of the churn risk of a customer according to the value of the said customer, the value of the operators on the market, number of better offers, number of the customers which he calls per operator and the simulations performed with the generic plans, applying an estimation algorithm.

13 Claims, 10 Drawing Sheets

1. Calculation of Current Bill
2. Calculation of Simulated Bill
3. Calculation of Risk Function
4. Calculation of New Offer

Fig. 4

1. Customer number
2. Telephone number
3. Month and year of analysis (mmyy)
4. Bill charged to the customer in mmyy

Fig. 5

1. Customer number
2. Telephone number
3. Currently contracted offer code

1. Customer number
2. Telephone number
3,4,5. Additional services contrated by the customer.

| 1 | 2 | 3 | 4 | 5 | 6 | 7 | 8 | 9 |

1. Customer number
2. Telephone number
3. Call destination (local, national, international) and destination operator
4. Day of the week (Monday, Tuesday, Wednesday, Thursday, Friday, Saturday and Sunday)
5. Time slot, from 00:00 to 24:00 with one-hour intervals
6. Mean duration in seconds performed by the subscriber in the combination of points 3,4,5
7. Mean amount charged to the customer in the combination of points 3,4,5
8. Mean no. of calls made in the combination of points 3,4,5
9. Indicates whether or not the mean consumption made in the combination of points 2,4,5 is to frequent numbers (1-> Yes Frequent Numbers, 0-> No Frequent Numbers)

Fig. 6

| 1 | 2 | 3 | 4 | 5 | 6 | 7 | 8 | 9 | 10 |
|---|---|---|---|---|---|---|---|---|---|
|   |   |   |   |   |   |   |   |   |    |

1. Customer number
2. Telephone number
3. Called telephone number
4. Call destination (local, national, international) and destination operator
5. Day of the week (Monday, Tuesday, Wednesday, Thursday, Friday, Saturday and Sunday)
6. Time slot, from 00:00 to 24:00 with one-hour intervals
7. Mean duration in seconds performed by the subscriber in the combination of points 3,4,5
8. Mean amount charged to the customer in the combination of points 3,4,5
9. Mean no. of calls made in the combination of points 3,4,5
10. Indicates whether or not the mean consumption made in the combination of points 2,4,5 is to frequent numbers (1-> Yes Frequent Numbers, 0-> No Frequent Numbers)

Fig. 7

1. Calculation of Current Bill
2. Calculation of Simulated Bill
3. Calculation of Risk Function
4. Calculation of New Offer

| 1 | 2 | 3 | 4 | 5 | 6 | 7 | 8 | 9 |
|---|---|---|---|---|---|---|---|---|

1. Customer number
2. Telephone number
3. Call destination (local, national, international) and destination operator
4. Day of the week (Monday, Tuesday, Wednesday, Thursday, Friday, Saturday and Sunday)
5. Time slot, from 00:00 to 24:00 with one-hour intervals
6. Mean duration in seconds performed by the subscriber in the combination of points 3,4,5
7. Mean amount charged to the customer in the combination of points 3,4,5
8. Mean no. of calls made in the combination of points 3,4,5
9. Indicates whether or not the mean consumption made in the combination of points 2,4,5 is to frequent numbers ( 1-> Yes Frequent Numbers, 0-> No Frequent Numbers)

| 1 | 2 | 3 | 4 | 5 | 6 | 7 | 8 | 9 | 10 |
|---|---|---|---|---|---|---|---|---|----|

1. Customer number
2. Telephone number
3. Called telephone number
4. Call destination (local, national, international) and destination operator
5. Day of the week (Monday, Tuesday, Wednesday, Thursday, Friday, Saturday and Sunday)
6. Time slot, from 00:00 to 24:00 with one-hour intervals
7. Mean duration in seconds performed by the customer in the combination of points 3,4,5
8. Mean amount charged to the customer in the combination of points 3,4,5
9. Mean no. of calls made in the combination of points 3,4,5
10. Indicates whether or not the mean consumption made in the combination of points 2,4,5 is to frequent numbers ( 1-> Yes Frequent Numbers, 0-> No Frequent Numbers)

Fig. 9

| $fr(x,j)$ | Attention Level 1 | Attention Level 2 | Attention Level 3 | Attention Level m |
|---|---|---|---|---|
| Risk Level 1 | $fr(1,1)$ | $fr(1,2)$ | $fr(1,3)$ | $fr(1,4)$ |
| Risk Level 2 | $fr(2,1)$ | $fr(2,2)$ | $fr(2,3)$ | $fr(2,m)$ |
| Risk Level 3 | $fr(3,1)$ | $fr(3,2)$ | $fr(3,3)$ | $fr(3,m)$ |
| Risk Level n | $fr(n,1)$ | $fr(n,2)$ | $fr(n,3)$ | $fr(n,m)$ |

Fig. 12

METHOD FOR PREPARING AN OPTIMAL ALTERNATIVE BILLING PLAN FOR MOBILE TELEPHONY USERS MANAGED THROUGH A CALL CENTER

The present invention is focused on the description of a method for recommending an optimal telephony plan to the customers of an operator considering the consumption of the customer, the risk of the customer migrating to another company and the market strategy of the operator.

BACKGROUND OF THE INVENTION

This patent is focused on the methods for retaining telephony clients by means of recommending plans which reduce the cost for the customer. The concept of recommendation has been present in literature for a long time and has given rise to a variety of patents such as "Method and Apparatus for Item Recommendation using Automated Collaborative Filtering" of Microsoft Corporation [1], "System and Methods for Collaborative Recommendations" of Amazon Inc. [2], as well as others from smaller companies such as Neonics Inc. [3] or Athenium LLC [4] [5]. All these patents generally have similar recommendation algorithms based on collaborative filtering, which recommend items to users based on similar preferences. In the literature there are also other patents which have problems similar to the one detailed herein, for example bank credit recommendation [6], which is solved using a decision tree, and insurance recommendation [8], solved by means of a series of interactions with the user.

Although the concepts set forth in the state of the art are similar to the method proposed herein, the type of problem and the way to solve it make the method proposed in this patent completely different.

In the telecommunications field there are patents with similar functionality to the proposed method, such as "Method of Selecting the Most Cost Effective Cellular Service Plan provided by Cellular Telephone Resellers to Multi-Line Customers" [8] of Motorola, which is focused on the problem of the recommendation of plans but only for users who have more than one line contracted or "System and Method for Recommending a Wireless product to a User" [9] which recommends a plan to a user based on the answers they give in a survey. More related to the proposed method are the patents "Method of Selecting a cost effective Service Plan" [10] of Motorola and "System and Method for Determining Optimal Wireless Communication Service Plans" [11] of Traq Wireless. Both patents propose a solution to the same problem which is tackled with the method proposed in this patent.

The present invention focuses on a different problem aimed at the method used in call centers of mobile operators, as shown in FIG. 1. The intention is to provide a different approach to the conception of the call centers, adding to the standards established in said systems (boxes 1 to n), at least one additional box and the flow marked in a dashed line corresponds to the new recommendation system proposed in the present invention, in which the process which will be detailed below is included.

The state of art of recommending mobile telephony plans for customers is focused on achieving the best offer for the customer [10] [11] [12], but it forgets many factors in a competitive environment (number of operators existing on the market, importance thereof, customer value, the operator which the user calls most frequently, difference between the billing with the current offer and the competition, better offers available on the market and better offers by the operator). In the case of reference [10], the main limitations are: (1) the system is based on processing call detail records or CDRs, and generally an operator cannot be expected to store the CDRs of all its users for an indefinite time period, this implies that the recommendation can only be made considering the last months of traffic and therefore seasonality problems can be incurred and (2) the recommendation of the plan is made by only considering which plan saves more money for the customer, without considering the position of the operator. Likewise, the method set forth in [11] and [12] only provides the recommendation of a plan in which the user saves more money. The invention set forth herein differs from the previous ones in that (1) the bill of the plans is not calculated by using CDRs but rather an aggregated representation of the behavior of each user, whereby the need to store the CDRs is prevented and it allows preventing the seasonality problem of the data; (2) the recommendation of the plan is made by not only considering the saving of the customer but also other factors including: (a) the level of risk of the customer going to the competition; (b) the ARPU (Average Revenue per User) of the customer in question and (c) the strategy of the company. Thus, the intention is to retain the customer by recommending a plan which involves a saving for him but also considering within those possibilities, the one which most favors the operator.

BRIEF DESCRIPTION OF THE INVENTION

The objective of this patent is to develop a method allowing any telephony operator to proactively or reactively migrate its customers to a new plan, thus preventing the churn risk caused by the existence of other offers from the competition.

The patent has four main mechanisms: (1) estimation of the real bill of a customer; (2) a method for estimating the bill of a customer using any generic plan based on the mean traffic of the last M months and (3) a method for calculating the churn risk according to the customer value, value of the operators on the market, number of better offers, number of the customers which he calls per operator, and the simulations performed with the generic plans and (4) the recommendation of an alternative considering the churn risk and the importance of the customer for the operator.

Thus, the proposed method comprises the following stages:

(a) estimation of the real bill of a customer during a selected predetermined time period covering the last M months, by processing the accumulated mean traffic, extrapolated to said last M months, obtaining the mean consumption of said customer in said selected period;

(b) simulated estimation of the bill of said customer using any generic plan based on the mean traffic of the last M months, applying a simulation algorithm;

(c) estimation of the churn risk according to the value of said customer, the value of the operators on the market, number of better offers, number of the customers which he calls per operator, and the simulations performed with the generic plans, applying a churn risk algorithm; and (d) selection of an alternative plan and presentation of said new plant to the customer in the form of a recommendation, wherein said estimation of the stages (a) and (b) said calculation of the churn risk of stage (c) are performed by information systems processing the data supplied by said first server, and wherein said operator offers to said user the mentioned alternative billing plan.

Sheets of drawings which illustrate the proposed method are attached for a better understanding.

BRIEF DESCRIPTION OF THE DRAWINGS

FIG. 4 shows an illustrative data structure of the bills extracted for each customer.

FIG. 5 shows a detailed data structure (upper band) including the plan or offers contracted by each customer and (lower band) the additional services contracted by each customer (if any).

FIG. 6 illustrates the data structure detailing the aggregation of the consumption information for the bill estimation with other plans.

FIG. 7 shows a data structure detailing the aggregation of information by called telephone number.

FIG. 9 illustrates the data sources used.

FIG. 12 is a table illustrating the risk function.

DETAILED DESCRIPTION OF SEVERAL EMBODIMENTS

The main data sources used by the proposed method are, on one hand, the traffic of each user, which is used to generate the mean consumption profile, and the information about the existing plans of both the operator itself and the competition.

The mean traffic considered covers the last M months and to prevent the typical seasonality problems associated with the use of the telephone, M>=6 is considered. Generally, operational systems do not usually store more than 3 months of traffic due to space problems, whereby the method requires using the mean consumption profile during those M months to have the information necessary for calculating the usage consumed. The consumption profile will be expressed in an aggregated manner in order to not have storage problems.

For the purpose of not exactly replicating the operational systems and making a viable system, the method takes the mean consumption of the selected period (M months) for the following dimensions:

a) Consumption scenario: The consumption scenario refers to the different possibilities of destinations of calls that a customer can make, dependent on the regulatory framework. Examples of different consumption scenarios are local calls, national calls, calls to other mobiles, incoming calls, outgoing calls etc.

b) Day of the week: The customers have different use profiles depending on the day of the week, it is therefore it is necessary to include said dimension in the method.

c) Time slot: The consumption of each customer will vary according to his profile according to the time, this dimension stores the consumption in each considered time slot.

For the purpose of being able to make the comparisons with different plans, there will be data with respect to the rest of the plans existing in the operator and to the plans existing in the competition. Furthermore, the method will have as an input the value that each of the customers of the operator has for such operator. This variable, called customer value, is a numerical variable assigning a number to each user in a scale expressed per 1 to N, based on the importance reported by the customer for the operator.

With the data previously described the objective sought is to search for an alternative plan which adapts to the greatest extent to the conditions of use of the subscriber and which adapts to the market conditions, i.e., which considers the plans existing in the operators of the competition.

When proposing the alternative plan, three variables must be contemplated mainly: (1) market strategy; (2) ARPU (Average Revenue per User) and (3) the influence of the competitors, as illustrated in FIG. 2.

Figure 1:
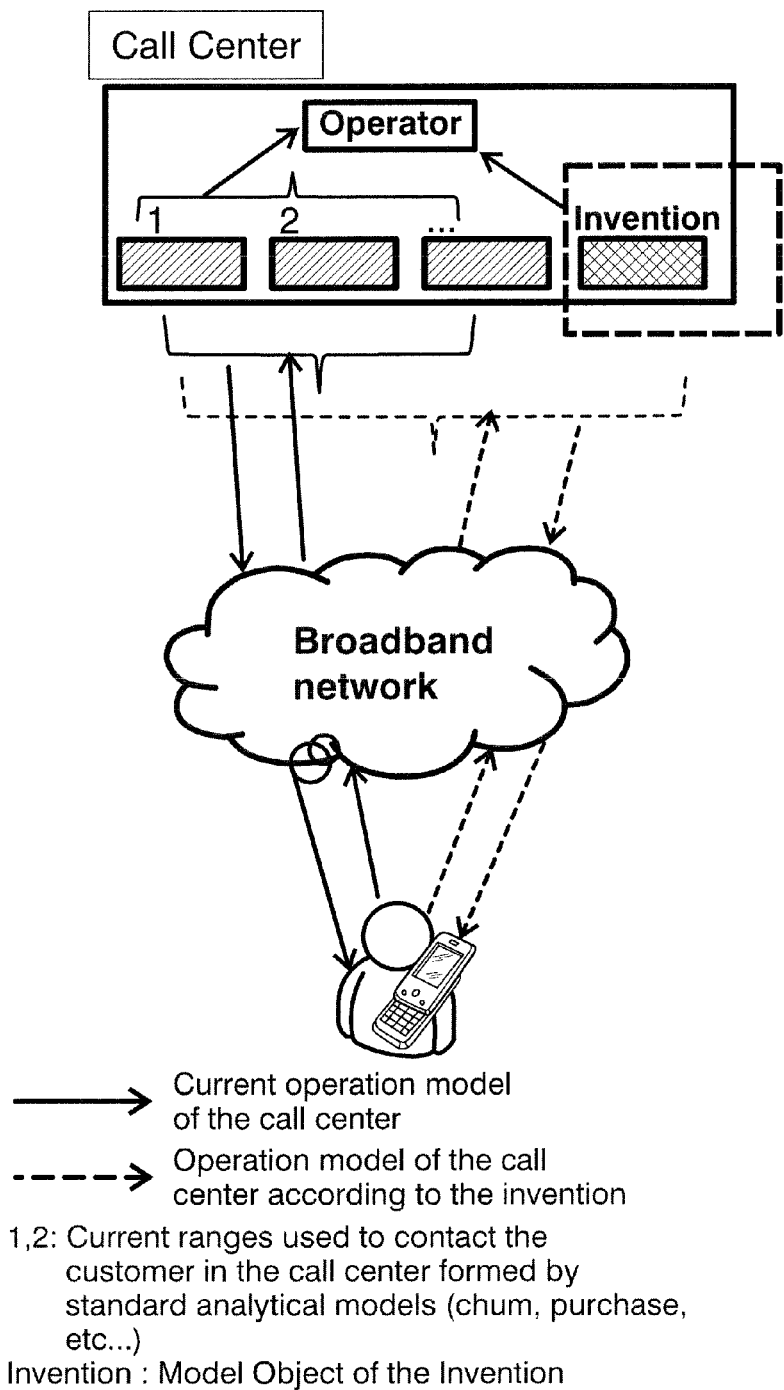
FIG. 1 schematically shows the scenario of the method of the present invention.
Figure 2:
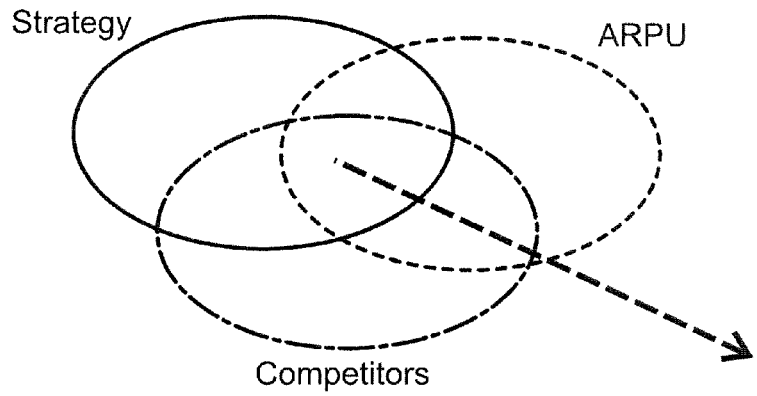
FIG. 2 shows the three variables considered by the method and from which the new rate or plan is identified for the user.
Figure 3:
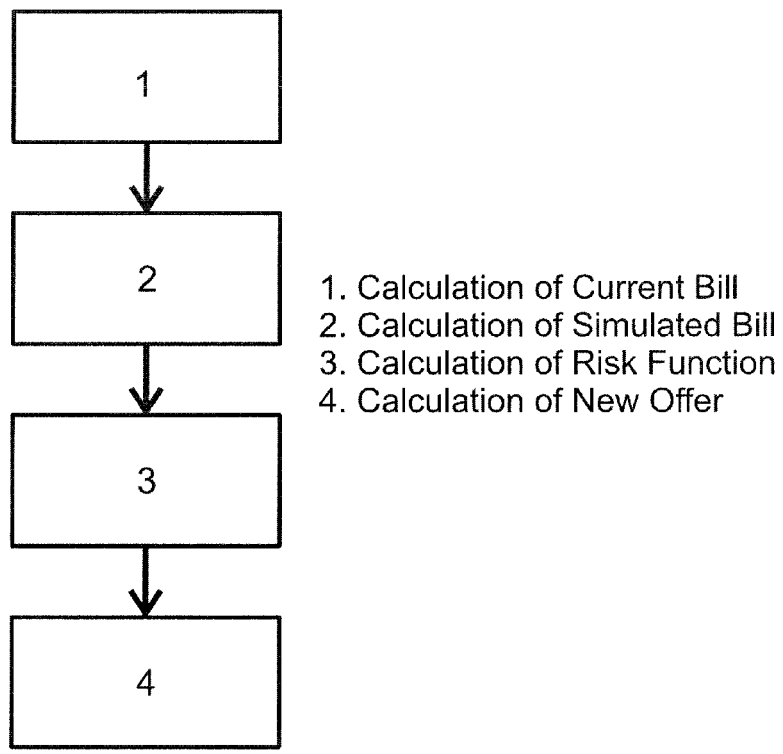
FIG. 3 is a detail of the set of steps performed in the present method to identify the new offer or plan for the user.

By combining the three blocks as shown in FIG. 2, the proposed method identifies a new plan for the customer which satisfies the considered variables. FIG. 2 details the workflow implemented for identifying the rate or plan which satisfies the previous conditions. The steps implemented in the work-flow are the following:

Calculation of the Bill of the Current Plan

The behavior of the customers is highly seasonal and, furthermore, during the considered time M the user may have changes services or added new ones. Due to the fact that the available traffic information of the user (mean traffic of n months at destination-day of the week-time slot level, to prevent storage problems, the simulation of the cost of the bill is not trivial. Due to this, although the value of the bill with the current plan is not a known datum, it is necessary to calculate by means of the proposed method how much the customer would be paying with his current offer. This calculation allows knowing the deviation of the method with respect to what the customer was actually billed and, furthermore, marks a reliability index of the usage obtained by means of the simulation with other plans.

Once the cost of the current plan has been calculated with the aggregated data for the M months considered, only if the real bill has a deviation ±5% with respect to the simulated one in each month it will be considered that the method for estimating the calculation for other plans (either of the operator itself or of the competition) can be implemented. In other words, this calculation on the real bill is an indicator of the seasonality of the behavior of the customer and on the capacity of the aggregated data used to capture the behavior of the customer and therefore an indicator of how predictable the calculation of the cost with other plans is.

Calculation of Bills with Other Plans

Once the current bill has been calculated and it has been validated that the deviation generated by the mean consumption, seasonality and possible changes over time is minimum with respect to the real cost, simulations are performed with the rest of the rates of the market using the aggregated call data. The simulation of the cost of the plans can be carried out using plans of the operator itself and of the competition, even including rates which are not commercial but the behavior in reality of which is to be studied.

Calculation of the Risk Function

Once the estimated bills according to the current plan and the rest of the plans included in the simulation are known, there is already sufficient information to calculate the risk function. The risk function is programmable and is formed by, among others, the following main variables: number of plans which reduce the cost with respect to the current plan, number of operators which have better plans, customer value, operator to which the customer makes the most calls. As a result, the risk function produces a score per customer, the higher the value, the greater the perception of the calculated risk.

Recommendation of an Alternative Plan

Considering the risk function of the customer (calculated in the previous point and the value which the customer has for the operator), and the level of attention at the time of the contact, an alternative plan recommendation function is implemented.

The method of this invention will be explained below in detail. It comprises several parts which are detailed below:
  Basic information
  Calculation of the current bill
  Calculation of the simulated bill
  Calculation of the risk function
  Calculation of the plan to be offered Basic Information The information necessary for each of the customers is detailed below:

Information about the Bills

It is necessary to have the bills of the M months prior to the simulation, where M is the number of months considered for the simulation of the plans. Formally, for each customer, his telephone number, the month and year of the bill and the value of the bill will be available as detailed in FIG. 4.

Current Offer of the Customer.

Said information provides the vision of which is his current offer with the operator, contracted plan as well as the additional modules and services, i.e., a customer may have contracted a determined offer with specific conditions of minutes, money package, etc., but he may additionally have contracted services which provide him with a determined consumption, for example a package of 500 SMS or unlimited traffic to 2 numbers. Formally, this information is captured in two data structures detailed in FIG. 5 (in two superposed lines) which identify on one hand the plan that a customer has and on the other hand the additional services that the customer has contracted. Both the plans and the additional services will be given by a dictionary which assigns a number or string to each plan and service.

Traffic Information.

To prevent duplicity problems in the systems of user traffic during the M months considered, the traffic will be aggregated considering the following fields:
  a. Telephone
  b. Consumption scenario
  c. Day of the week (Monday, Tuesday, Wednesday, Thursday, Friday)
  d. Time slot (00:00 to 24:00)
  e. Indicator of frequent numbers and other numbers. This information is necessary to know from the start how much consumption is made by the customer to his favorite number and how much to other numbers From these fields in which the information has been aggregated, it is possible to obtain the following information:
  f. Real duration of the calls made in the aggregation level considered (total duration/number of months of analysis)
  g. Mean billing in the interval. This field will serve as a support for the certification of the estimations.
  h. Mean number of calls made in the aggregation level considered.

FIG. 6 details the data structure which stores the specified information.

Information of Frequent Numbers.

This information serves as a basis for the simulation of frequent numbers per operators, key elements for identifying an optimal plan. Said information adds the field Called Telephone Number as an aggregation level to the previously detailed traffic information. Furthermore, an indicator which indicates if the called telephone number has been selected or not by the customer as a frequent number. This indicator will be used in the process for simulating additional offers or services including special numbers, such that if the customer has two numbers considered as frequent numbers and a service of three usual numbers is simulated, the two (explicitly requested by the customer) will be taken as a basis and the next most frequently called one will be added. FIG. 6 shows the data structure which details the aggregation by Called Telephone Number.

Figure 8:
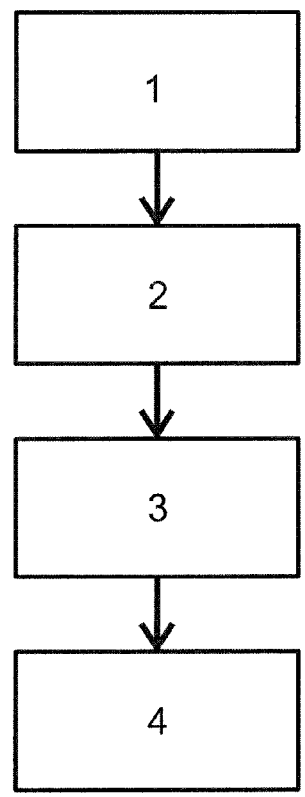
FIG. 8 is a detail of the set of steps performed by the method to identify a new offer or plan for a user.

FIG. 7 details the steps of the work-flow of the invention, which includes the calculation of the current bill and the calculation of the simulated bill. The calculation of both bills is performed by means of the same process. As indicated above, the calculation of the current bill has to be performed to assure that the simulations obtained of the cost of the bill are not deviated by more than the limit considered as the correct one during the M months of analysis. Said test must be performed to prevent storage problems, since the calculation of the estimation of the cost is not performed on the real traffic data but on the accumulated data detailed in FIGS. 8 and 9. Once it has been verified that the real bill does not deviate by ±5% with respect to the simulation of the plan which the customer has contracted, the following step, the simulation of other plans of the company and of the competition to be able to calculate the risk function, is performed.

When simulating the calculation of the cost of the plan, the different variables which are considered in a telephony plan must be considered, including:
  Versatility in the time unit to be charged per minute, per second or per any time unit etc.
  Minute package, where free minutes are offered to different call scenarios.
  Cash package, where money is offered to different call scenarios.
  Event package, where events (SMS, MMS, others).
  Unlimited calls to different destinations and numbers.
  Frequent numbers, where the user can choose special conditions The definitions used and the mechanism for estimating the calculation of the cost of the plans are detailed below.

DEFINITIONS

CD: Current Bill
SB: Simulated Bill
FN: Free telephone Numbers
PL: Plan or Rate
ML: Additional modules contracted by a subscriber.
PK: Packages included in the PLs or MLs.
SD: Call destination.

The estimation of the cost of the plans is divided into a series of consecutive steps:
  (1) distribution of the consumptions,
  (2) Use and application of the packages;
  (3) Calculation of billable consumptions per time unit;
  (4) Calculation of billable consumptions per money unit;
  (5) Calculation of the amount of the calls;
  (6) Calculation of the simulated bill to the customer,
  (7) Calculation of the risk function and
  (8) Identification of the new offer.

Step 1: Distribution of the Consumptions

Figure 10:
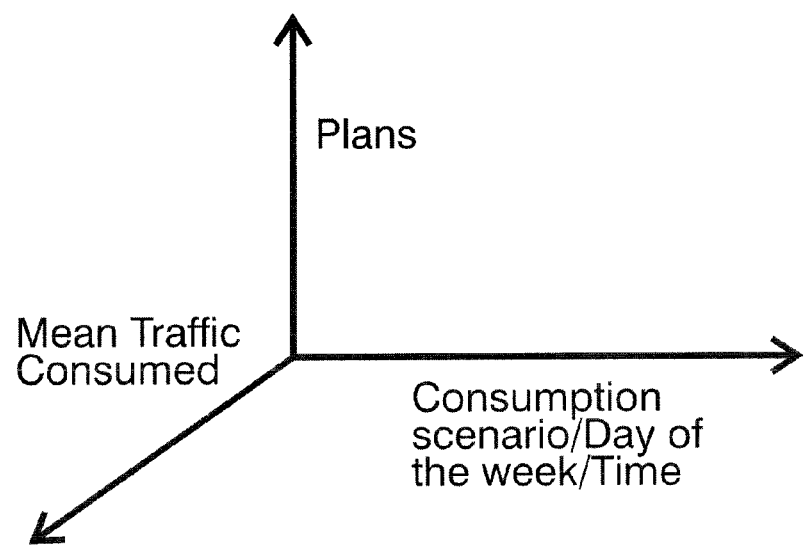
FIG. 10 is an illustrative diagram of a consumption distribution data structure.

The accumulated traffic information of each of the customers is distributed over a three-dimensional matrix as shown in FIG. 10, which considers the dimensions of Call Destination/Days of the week and Time slot for each offer associated with the customer. FIG. 9 shows the data structure used to represent the distribution of consumptions.

Step 2. Use and Application of Packages (PK)

The objective of this step is to obtain the minutes which the user must be billed once the voice minutes included in the contracted packages (amount of minutes or money units, which have already been paid in the monthly fee, so they are free of charge) have been deducted. In the event that the user has no contracted package, the traffic represented by means of the three-dimensional matrix would be left as is. The following cases are distinguished:

If the package is an FN (Free Number), the times indicated in the package will be billed at the indicated and special price for a Free Number.

If the package is by time, the real minutes to be billed are calculated, since a part of them are included in the packages (the corresponding distribution in the package is deducted from the real one).

If the package is by Money Units, the minutes to be billed are calculated by deducting those used in the package and previously billed.

The packages are only applied to the SDs included therein, therefore they must be multiplied by a compensation ratio. If all the SDs are included in the package, the package is directly applied to each datum of the matrix (ratio=1).

If only half the SDs are included in the package, it is distributed, applying only among half of the destinations (ratio=0.5).

Step 3. Calculation of Billable Consumptions when the Package is by Time Unit.

The package is applied to each of the destinations.

The package is distributed percentage-wise among the selected destinations, SDs, using the correction factor corrector of Step 2, according to the following formula:

$$\text{min bill} = \text{min} - \frac{\text{deduct} * \% \text{ use} * \text{ratio}}{100}$$

Where minbill represents the minutes to be billed after applying the packages, the calculation of which is obtained from the difference between the real minutes and those included in the packages. The min factor represents the total minutes consumed, deduct represents the minutes included in the package, use represents the percentage made by the customer with respect to the destination SD and the ratio is the correction factor.

If there are more minutes included in the package than those generated by the customer, the billable time will be 0

Step 4. Calculation of billable consumptions when the package is per money unit

The steps to be followed are the following, applying the package to each of the selected call destinations, SDs:

Calculating the price of the call, using the price belonging to the package $$\text{amount} = \text{price Rental} \cdot \text{min} \cdot \frac{\left[ \begin{array}{l} \text{if } (durMean \leq mbtu) \to \text{otherwise} \to btu \cdot \text{ceil} \\ \left( \frac{durMean - mbtu}{btu} \right) + mbtu \end{array} \right]}{durMean}$$

Where amount represents the bill of the consumption made in the package. The factor priceRental is the price per time unit of the corresponding package, min indicates the minutes used within the package. The last factor calculates the rounding off to convert it into billable time units. Where mbtu is the billable minimum time unit, btu is the billable time unit, ceil is the mathematical function indicating the rounding off to the immediately higher integer and durMean indicates the real mean duration of the calls.

Once the billable amount of the consumption made in the package has been obtained, the minutes to be billed are calculated following a formula similar to that of Step 2. To that end, the deductible (package) value is applied percentage-wise among the selected destinations using the correction factor of step 2.

$$\text{min bill} = \frac{\text{amount} - \frac{\text{deduct} \cdot \% \text{ use} \cdot \text{ratio}}{100}}{\text{priceRental}}$$

The billable minutes are calculated based on the price within the package, for the purpose of knowing which additional amount of the call must be billed.

Step 5. Calculation of the Amount of the Call

Once the conditions of the contracted package or packages have been applied (deducting minutes from the calls where applicable or attributing a special piece to a call), the price of calls by destination is calculated over the billable minutes calculated in Step 4, multiplying the price by the billable minutes with the correction factor of the rounding off in the charge:

$$\text{additional\_amount} = \text{price} \cdot \text{min} \cdot \frac{\left[ \begin{array}{l} \text{if } (durMean \leq mbtu) \to mbtu \\ \text{otherwise} \to btu \cdot \text{ceil}\left( \frac{durMean - mbtu}{btu} \right) + mbtu \end{array} \right]}{durMean}$$

Where additional_amount is the additional billing not included in the packages, price is the amount per billed minute, min is the number of real minutes and the last factor indicates the rounding off of the real minutes.

Step 6. Calculation of the Simulated Bill to the Customer

The following point calculates the simulated bill which is obtained as the sum of the price of the calls plus the basic fee from the subscriber if any. Formally:

FinalBill=BasicRental+additional_amount−Discounts in % or in absolute value.

Where BasicRental indicates the monthly rental contracted by the customer if any. The additional_amount is the value obtained in Step 5 and the Discounts are those included in the contracted plan (if any).

Step 7. Calculation of Risk Function and of Risk Level.

The risk function which is assigned to a subscriber is given by the following parameters:

Customer Value: Value expressed per unit which indicates for each value segment, defined by the operator, an importance value (VC) is assigned.

Delta Function (DELTA): Range of difference in % which indicates the difference between the current offer of the subscriber and any of the simulated ones, the importance value will be assigned according to said percentage, i.e., the greater the difference, the higher the imputed value.

Better Offers (OF): Value assigned to the number of offers better than the current one after having performed the simulation, and which takes from 0 convenient plans (none) to N convenient plans.

Frequent Operator (NF): Value assigned to the operator most called by the subscriber and which will correspond with the value 100 and 0 for the rest.

Number of Best Plan Operators (OP): Value assigned to the Number of Operators with which the customer may have had better offers, the minimum value being 1 and the maximum value (the Number of operators which operate in the analysis framework).

Operator Value (VLOP): A value between 0 and 100 is assigned, 100 being the maximum value, according to the importance on the operations market.

With the previously defined parameters, a risk function f is created which measures the risk of the subscriber in the defined and executed framework.

$$f(Ci) = VC^*(DELTA + OF + NF + OP + VLOP)$$

Figure 11:
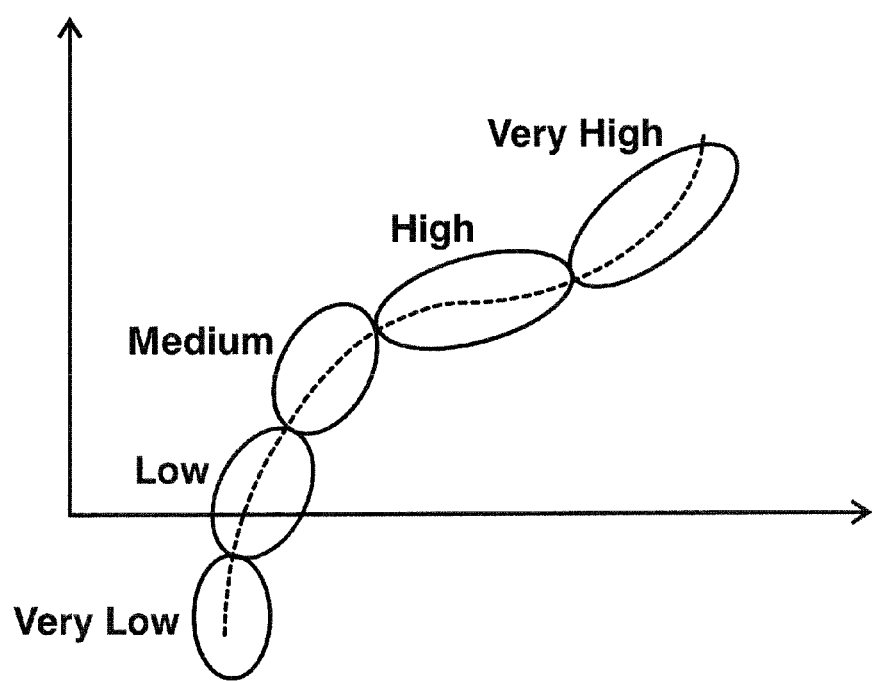
FIG. 11 shows in a diagram the risk levels obtained from the risk function.

Once the risk function for a customer has been calculated from this value, the risk level is calculated. The model uses five risk levels: (1) very low, (2) low, (3) medium, (4) high and (5) very high, defined ad-hoc as ranges of the values of the risk function as shown in FIG. 12. FIG. 11 shows the values of the five levels used. The maximum obtained for each of the simulations is selected.

CITED REFERENCES

[1] "Method and Apparatus for Item Recommendation Using Automated Collaborative Filtering", A. Chislenko. Y. Z. Lashkari, J. McNulty, Microsoft Corporation, U.S. Pat. No. 6,041,311, Date of patent: Mar. 21, 2000.

[2] "System and Methods for Collaborative Recommendations", J. A. Jacobi, E. A. Benson, Amazon.com Inc., U.S. Pat. No. 6,064,980, Date of patent: May 16, 2000.

[3] "System and Methods for Recommending Items", J. B. Hey, Neonics Inc., U.S. Pat. No. 4,996,642, Date of patent: Feb. 26, 1991.

[4] "Automated Collaborative Filtering System", G. B. Robinson, Athenium L. L. C., U.S. Pat. No. 5,790,426, Date of patent: Aug. 4, 1998.

[5] "Automated Collaborative Filtering in World Wide Web Advertising", G. B. Robinson, Athenium L L C, U.S. Pat. No. 5,918,014, date of patent: Jun. 29, 1999.

[6] "Expert Credit Recommendation Method and System", E. F. Saladin, K. V. Mate, H. Gers, K. A. Ruhlin, ITT Corporation, U.S. Pat. No. 5,262,941, Date of patent: Nov. 16, 1993.

[7] "Method and System to recommend Insurance Plans", E. Schumacher, J. Hutchings, Pub. No.: US2006/0293828A1, Pub. Date: Dec. 28, 2006.

[8] "Method of Selecting the Most Cost Effective Cellular Service Plan Provided by Cellular Telephone Resellers to Multi-Line Customers", U.S. Pat. No. 5,027,388, Date of patent: Jun. 25, 1991.

[9] "System and Method for Recommending a Wireless Product to a User, C. Lema, R. Keeney, M. Fuller, Pub. No.: US 2002/0065721A1, Pub. Date: May 30, 2002.

[10] "Method of Selecting a Cost Effective Service Plan", R. J. Cheslog, Motorola Inc., U.S. Pat. No. 5,659,601, Date of patent: Aug. 19, 1997.

[11] "System and Method for Determining Optimal Wireless Communication Service Plans", W. marsh, D. Langworthy, J. Gonzales, Traq Wireless Inc., U.S. Pat. No. 6,574,465B2, Date of patent: Jun. 3, 2003.

[12] "Providing a Rebate to a User of a Telecommunication Plan", W. Marsh, W. DeCesaris, Pub. No.: US 2007/0202846A1, Pub. Date: Aug. 30, 2007.

The invention claimed is:

1. A method for preparing an optimal alternative billing plan for mobile telephony operators managed through a call center, based on processing by at least one first service server of information relating to billing of different telecommunication services used by a customer, including duration and time slot of use, the method comprising:

(a) estimating a real bill of the customer during a selected time period covering M preceding months, using a processor of the at least one first service server, by processing accumulated mean traffic, extrapolated to the M preceding months, obtaining a mean consumption of the customer in the selected time period;

(b) simulating estimating a bill of the customer using at least one generic plan based on the accumulated mean traffic of the M preceding months, by using the processor to apply a simulation algorithm;

(c) estimating a churn risk of the customer, using the processor, according to a value of the customer, a value of operators on the market, a number of better offers, a number of customers called per operator, and the simulations performed with the at least one generic plan, applying a churn risk algorithm; and (d) selecting an alternative plan and presenting to the customer the selected alternative plan in the form of a recommendation, wherein the (a) estimating the real bill, the (b) simulating estimating the bill, and the (c) estimating the churn risk are performed by the processor using data supplied by the first service server.

2. The method according to claim 1, wherein in (a), the mean consumption of the customer in the selected time period is acquired considering dimensions comprising:

consumption scenario: different possibilities of destinations of calls that a customer can make, dependent on a regulatory framework, from a group comprising local calls, national calls, calls to other mobiles, incoming calls, or outgoing calls;

day of the week: differences of use dependent on day of the week; and time slot: consumptions of the customer are stored according to several time slots considered.

3. The method according to claim 1, wherein in (b), a value of the bill of the customer during the selected time period of M months is first calculated applying a current billing plan at a time of the estimating, and the estimating applying other plans will be performed according to whether or not there is a deviation of ±5% from the real bill with respect to the simulated bill in each month.

4. The method according to claim 1, wherein the estimating of the churn risk of the customer comprises an algorithm operating a programmable risk function formed by variables comprising a number of billing plans which reduce cost with respect to a current billing plan, a number of operators which have better billing plans, customer value, and an operator to which the customer makes a majority of calls, and wherein the churn risk of the customer is expressed as a score per customer, wherein a comparatively higher value indicates a comparatively greater perception of calculated risk.

5. The method according to claim 1, wherein in (a), data for estimating the real bill of the customer comprise a first piece of information about bills in a form of structured data including a customer number, a telephone number, a month and year of analysis, and a bill charged in the month and year of analysis and a second piece of information in a form of structured data relating to a current offer of the customer, including, in addition to the customer number and the telephone number, a code indicating a contracted offer at a time of performing the estimating, as well as a detail of all additional services contracted by the customer in an estimation period.

6. The method according to claim 5, wherein in (a), the estimating also takes into account fields comprising:
consumption scenario;
day of the week;
time slot; and
indicator of frequent numbers.

7. The method according to claim 1, wherein in (b), data for the simulating estimating comprise a piece of information which details an aggregation of consumption information for other plans and which comprises an evaluation of numbers susceptible of being added as "frequent" numbers, "time slots of greatest use," and contracted "service packages."

8. The method according to claim 1, wherein an estimation algorithm comprises accumulated traffic information of each of the customers distributed over a three-dimensional matrix which considers dimensions of call destination/day of the week and time slot for each offer associated with a customer.

9. The method according to claim 8, wherein there is introduced in the three-dimensional matrix a correction according to packages contracted (amount of minutes or money units which have already been paid in a monthly fee) by a determined customer according to selected destinations (SDs).

10. The method according to claim 9, wherein the package is distributed percentage-wise among the SDs using a correction factor according to the following formula:

$$\text{min bill} = \text{min} - \frac{\text{deduct} * \% \text{ use} * \text{ratio}}{100}$$

wherein "min bill" represents minutes to be billed after applying the package based on a difference between real minutes and minutes included in the package, "min" represents total minutes consumed, "deduct" represents the minutes included in the package, "% use" represents a percentage made by the customer with respect to the destination SD, and "ratio" is a correction factor and if there are more minutes included in the package than those generated by the customer, billable time will be 0.

11. The method according to claim 1, wherein a risk function f assigned to a subscriber is given by parameters comprising:
Customer Value: Value expressed per unit which indicates for each value segment, defined by the operator, an importance value (VC) is assigned;
Delta Function (DELTA): Range of difference as a percentage which indicates a difference between the current offer of the subscriber and any simulated offers, an importance value will be assigned according to the percentage, i.e., a comparatively greater difference is associated with a comparatively higher imputed value;
Better Offers (OF): Value assigned to a number of offers better than the current offer after having performed the simulation, and which takes from 0 convenient plans (none) to N convenient plans;
Frequent Operator (NF): Value assigned to an operator most called by the subscriber and which will correspond with a value 100, and 0 for other operators;
Number of Best Plan Operators (OP): Value assigned to a number of operators with which the customer may have had better offers, a minimum value being 1 and a maximum value (a number of operators which operate in an analysis framework); and
Operator Value (VLOP): A value between 0 and 100 is assigned, 100 being a maximum value, according to an importance on the operations market,
creating the risk function f with the parameters $$f(Ci)=VC*(DELTA+OF+NF+OP+VLOP)$$

which measures the churn risk of the subscriber in the analysis framework.

12. The method according to claim 11, wherein once the risk function f for a customer has been calculated, the churn risk of the customer is calculated using risk levels comprising (1) very low, (2) low, (3) medium, (4) high, and (5) very high, the risk levels being defined as ranges of values of the risk function f, and a maximum obtained for each of the simulations is selected.

13. A non-transitory computer readable medium storing a program causing a computer to execute a method for preparing an optimal alternative billing plan for mobile telephony operators managed through a call center, based on processing by at least one first service server of information relating to billing of different telecommunication services used by a customer, including duration and time slot of use, the method comprising:
(a) estimating a real bill of the customer during a selected time period covering M preceding months, using a processor of the at least one first service server, by processing accumulated mean traffic, extrapolated to the M preceding months, obtaining a mean consumption of the customer in the selected time period;
(b) simulating estimating a bill of the customer using at least one generic plan based on the accumulated mean traffic of the M preceding months, by using the processor to apply a simulation algorithm;
(c) estimating a churn risk of the customer, using the processor, according to a value of the customer, a value of operators on the market, a number of better offers, a number of customers called per operator, and the simulations performed with the at least one generic plan, applying a churn risk algorithm; and
(d) selecting an alternative plan and presenting to the customer the selected alternative plan in the form of a recommendation,
wherein the (a) estimating the real bill, the (b) simulating estimating the bill, and the (c) estimating the churn risk are performed by the processor using data supplied by the first service server.

* * * * *